(12) United States Patent
Ali et al.

(10) Patent No.: US 9,047,760 B2
(45) Date of Patent: *Jun. 2, 2015

(54) HIGH TRAFFIC DATA TRANSMISSION

(75) Inventors: Hassan Ali, Braintree, MA (US);
Timothy J. Brown, Mattapoisett, MA (US); Robert Henry Grady, Rumford, RI (US); David Edwin Splitz, Sandwich, MA (US); Brent Dukes, Raynham, MA (US)

(73) Assignee: Mueller International, LLC, Atlanta, GA (US)

( * ) Notice: Subject to any disclaimer, the term of this patent is extended or adjusted under 35 U.S.C. 154(b) by 316 days.

This patent is subject to a terminal disclaimer.

(21) Appl. No.: 13/559,573

(22) Filed: Jul. 26, 2012

(65) Prior Publication Data

US 2014/0028470 A1    Jan. 30, 2014

(51) Int. Cl.
*G08C 15/06* (2006.01)
*H04Q 9/00* (2006.01)

(52) U.S. Cl.
CPC ............ *G08C 15/06* (2013.01); *H04Q 2209/40* (2013.01); *H04Q 9/00* (2013.01); *H04Q 2209/60* (2013.01)

(58) Field of Classification Search
CPC .... G01D 4/004; H04L 45/127; H04W 40/005
USPC ........................................ 340/870.02, 870.03
See application file for complete search history.

(56) References Cited

U.S. PATENT DOCUMENTS

| 6,370,126 B1 | 4/2002 | Da Baere et al. |
| 2005/0176416 A1 | 8/2005 | Desch et al. |
| 2008/0084330 A1 | 4/2008 | Picard |
| 2009/0222828 A1 | 9/2009 | Lefevre et al. |
| 2012/0078428 A1 | 3/2012 | Henderieckx |
| 2012/0131324 A1 | 5/2012 | Ansari et al. |

FOREIGN PATENT DOCUMENTS

WO    2011123893    10/2011

OTHER PUBLICATIONS

Ali, Hassan; PCT Application entitled: High Traffic Data Transmission, having serial No. PCT/US13/51607, filed on Jul. 23, 2013, 28 pgs.
Ali, Hassan; International Search Report and Written Opinion for serial No. PCT/US13/51607, filed on Jul. 23, 2013, mailed Oct. 22, 2013, 10 pgs.

(Continued)

*Primary Examiner* — Steven Lim
*Assistant Examiner* — Omeed Alizada
(74) *Attorney, Agent, or Firm* — Taylor English Duma LLP (57) ABSTRACT

The present disclosure relates to systems and methods for communicating with a radio frequency (RF) device. An exemplary method includes: listening, by the collector node, during a listening period, for a hailing signal from a plurality of RF devices on a hailing channel, the hailing signal including identification of a specified data channel; in response to receiving the hailing signal from one of the plurality of RF devices, switching to the specified data channel and receiving data, by the collector node, on the specified data channel; collecting, by the collector node, during a collecting period, data from the plurality of RF devices; and receiving, by the collector node, the data from at least one of the plurality of RF devices, wherein the listening period and the collecting period occur at different times.

9 Claims, 5 Drawing Sheets

(56) References Cited

OTHER PUBLICATIONS

Edison Electric Institute. Smart Meters and Smart Meter Systems: A Metering Industry Perspective. Mar. 2011 (Retrieved on Oct. 3, 2013) Retrieved from internet: <URL: http://www.aeic.org/meter_service/smartmetersfinal032511.pdf>.

Ali, Hassan; U.S. Patent Application entitled: High Traffic Data Transmission for U.S. Appl. No. 13/559,572, filed Jul. 26, 2012; 29 pgs.

Ali, Hassan; Non-Final Office Action for U.S. Appl. No. 13/559,572, filed Jul. 26, 2012, mailed Sep. 19, 2014, 34 pgs.

Ali, Hassan; Corrected Notice of Allowability for U.S. Appl. No. 13/559,572, filed Jul. 26, 2012, mailed Feb. 6, 2015, 12 pgs.

Ali, Hassan; Corrected Notice of Allowability for U.S. Appl. No. 13/559,572, filed Jul. 26, 2012, mailed Mar. 11, 2015, 8 pgs.

Ali, Hassan; Corrected Notice of Allowability for U.S. Appl. No. 13/559,572, filed Jul. 26, 2012, mailed Mar. 23, 2015, 9 pgs.

Ali, Hassan; Notice of Allowance for U.S. Appl. No. 13/559,572, filed Jul. 26, 2012, mailed Jan. 27, 2015, 15 pgs.

Ali, Hassan; International Preliminary Report on Patentability for serial No. PCT/US2013/051607, filed on Jul. 23, 2013, mailed Feb. 5, 2015, 8 pgs.

HIGH TRAFFIC DATA TRANSMISSION

CROSS-REFERENCE TO RELATED APPLICATIONS

This application is related to co-pending U.S. application Ser. No. 13/559,572, filed on even date herewith and titled "High Traffic Data Transmission," which has the same listed inventors as the present application, and wherein the entire disclosure of that application is hereby incorporated by reference herein.

TECHNICAL FIELD

The present disclosure generally relates to mesh networks and the operation of radio frequency devices, and more particularly relates to the sending and receiving of data packets within a mesh network during periods of high traffic data transmission.

BACKGROUND

Typically, utility meters (e.g., gas meters, water meters, electricity meters, etc.) are read manually by meter readers who are employees or contractors of the various utility providers. Manual meter reading represents a significant cost to a typical utility provider. With the advent of wireless technology including mesh networking, utility providers have sought methods and systems for remote reading of meters and/or remote control of the meters or an attached device or apparatus.

Advanced Metering Infrastructure (AMI), Advanced Metering Reading (AMR), or Advanced Metering Management (AMM) are systems that measure, collect, and analyze utility data using advanced metering devices such as water meters, gas meters, and electricity meters. The advanced metering devices combine internal data measurements with continuously available remote communications, enabling the metering devices to transmit and receive data through the AMI, AMR, and/or AMM network. In a typical configuration, an advanced metering device, such as an advanced water meter, measures and collects usage data, such as water usage data, at a customer's location. The metering device then uses a built-in communication interface to transmit data to a parent node up the network, often in response to the parent's request for such information. In this way, utility providers may remotely "read" customer usage data for billing purposes.

The transmitting and receiving components of the mesh network (i.e., utility provider, collector nodes, repeater nodes, meters, etc.) may communicate using radio frequency (RF) transmission. However, in some environments having a high number of nodes concentrated around a collection node, data collisions may occur, especially during peak times of data transmissions (e.g., reporting meter usage data during times of heavier traffic), making communications between devices more difficult and less efficient.

SUMMARY

The present disclosure relates to systems and methods for communicating with a radio frequency (RF) device. An exemplary method includes: listening, by the collector node, during a listening period, for a hailing signal from a plurality of RF devices on a hailing channel, the hailing signal including identification of a specified data channel; in response to receiving the hailing signal from one of the plurality of RF devices, switching to the specified data channel and receiving data, by the collector node, on the specified data channel; collecting, by the collector node, during a collecting period, data from the plurality of RF devices; and receiving, by the collector node, the data from at least one of the plurality of RF devices, wherein the listening period and the collecting period occur at different times.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure describes systems and methods for operating radio frequency (RF) devices such as Advanced Metering Infrastructure (AMI) devices using frequency-hopping spread spectrum technology. More particularly, the systems and methods disclosed herein relate to the sending and receiving of data packets within a mesh network during periods of high traffic data transmission.

Existing AMI deployments rely on and utilize mesh networks and mesh networking devices to transmit and to receive data between nodes within a utility provider's network. Many of these devices employ frequency-hopping spread spectrum (FHSS) technology in compliance with Federal Communications Commission (FCC) rules and regulations part 15 (47 C.F.R. §15). FHSS is a method of transmitting and receiving radio signals by rapidly switching among many frequency channels using a pseudorandom channel sequence known to both the transmitting and receiving devices.

Because of the remote placement nature of the advanced metering devices, it is desired to maximize battery life of the metering devices in order to reduce down time and to reduce the amount of maintenance that must be performed on the metering devices. Similarly, it is desired to maximize responsiveness in communications between the advanced metering devices and the utility provider network while complying with FCC rules and regulations. It is also desired to reduce interference and background noise that may cause communication failures and that may further decrease battery life of the advanced meters. Additionally, because the number of devices within the AMI mesh network may result in network traffic collision during peak data collection times, it is desired to reduce collisions and maximize communication efficiency between and among RF devices within the AMI mesh network. As will be further understood from the present disclosure, these objectives may be satisfied through a hybrid system of pushing data from meters to a collector node during off-peak times and pulling data from the meters by the collector node during peak times.

While the present disclosure relates to mesh networking, as those having ordinary skill in the art will recognize, the present disclosure may be utilized in other types of networking environments, such as point-to-point FHSS networks as well.

As used herein, a MASTER state device, a device in MASTER state, or a master device is a device that is attempting to send data to another device. In the present disclosure, the master device is often, though not always, the utility meter, which contains utility usage data to be sent to a collection device (or node). A SLAVE state device, a device in SLAVE state, a slave device, or a target device is a device to which the master is attempting to send data. In the present disclosure, the slave device is often, though not always, a collection device (or node) for collecting utility usage data from a plurality of meters. Throughout the present disclosure, the terms "device" and "node" may be used interchangeably.

Figure 1:
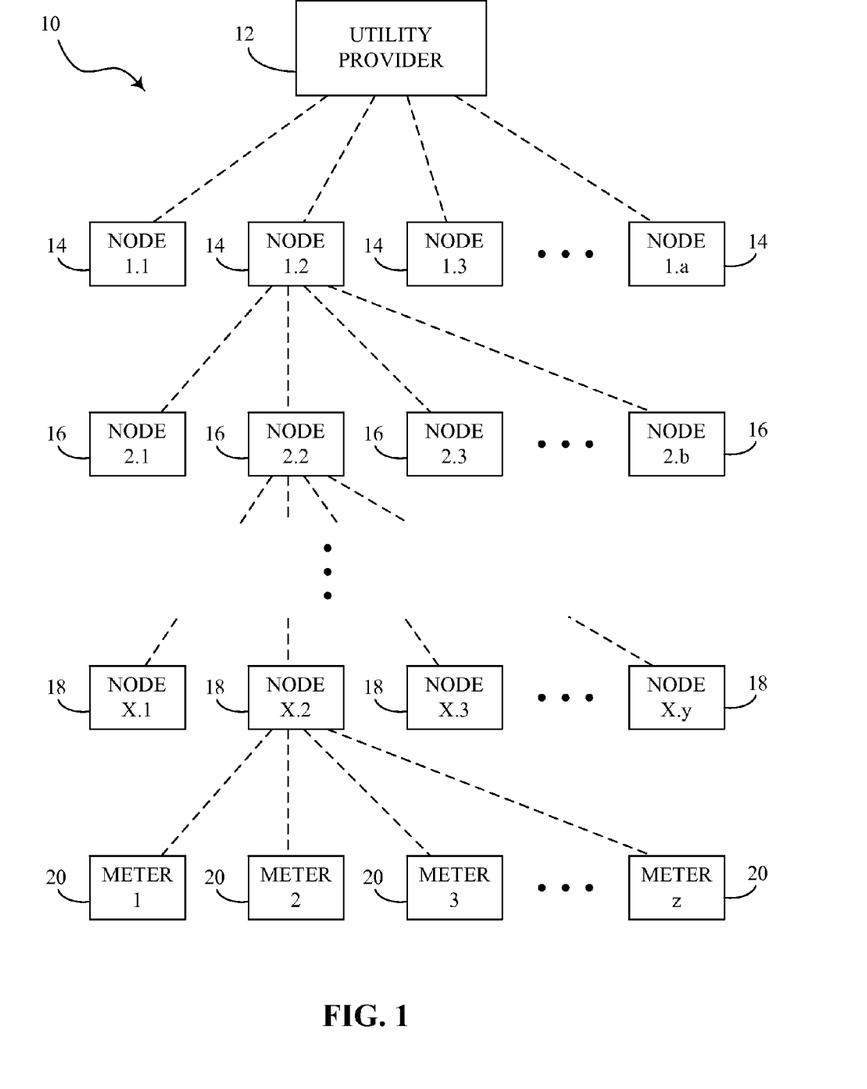
FIG. 1 is a block diagram of an AMI mesh network according to various implementations of the present disclosure.

As used herein, "parent" and "child" nodes should not be confused with "MASTER state" and "SLAVE state" devices. MASTER state and SLAVE state are merely states/modes for each device. "Parent" and "child" nodes have a predefined relationship based on hierarchy (i.e., a parent node such as device 14 in FIG. 1 is further up the hierarchy in relation to the utility provider 12 than a child node such as devices 16, 18, 20 in FIG. 1). Although the present disclosure describes a single parent to multiple child relationship, it should be understood that multiple parents may exist within the same network. Further, a child may have multiple parents. In various embodiments, a single parent may be paired with a single child. As an example, child nodes may represent individual customers' utility meters while a parent node may represent a primary data collection device (i.e., "collector node") responsible for collecting data from and sending data to each child device. This configuration requires that the system time be highly accurate, as will be further understood herein.

Utility companies must periodically determine customer utility usage by taking meter readings. To facilitate this process, to reduce costs to the utility companies, and to increase efficiency, utility meters (e.g., meters 20 in FIG. 1) in the present disclosure may transmit usage data wirelessly through a network (e.g., network 10), such as a mesh network, back to the utility provider (e.g. utility provider 12 in FIG. 1). To reduce costs further while increasing reliability and efficiency, it is an object of the present disclosure to reduce data communication collision within the mesh network, to provide for efficient communication between nodes within the mesh network, to reduce system response times, and to provide for prioritized interrupts (i.e., priority messages) during emergency situations such as a water leak. In one embodiment, each of the utility company's AMI RF devices is in one of 3 states: SLEEP state used to conserve battery life; SLAVE state used for responding to and receiving data from a MASTER state device; and MASTER state used to initiate communications with (i.e., "hail") and send data to a SLAVE state device.

In SLEEP state, a device partially awakens and briefly listens for a "hailing" signal on a hailing channel from another device in MASTER state. The SLEEP state may include the device being partially or completely off in order to conserve battery life. If the device in SLEEP state fails to detect a hailing signal, the device remains in SLEEP state and periodically partially awakens to listen for a hailing signal. The SLEEP state device changes hailing channels based on a predefined pseudorandom hailing channel frequency set dependent upon a system time. Once the SLEEP state device is "hailed" by a MASTER state device, it fully awakens and begins listening for data messages from the MASTER state device on a predefined data channel selected from the predefined pseudorandom data channel frequency set, the data channel being indicated by the MASTER state device. In other words, the SLEEP state device exits SLEEP state and enters SLAVE state.

In SLAVE state, a device listens for and receives data messages on a data channel selected from the predefined pseudorandom data channel frequency set. The MASTER state device indicates which data channel to use by sending a data channel pointer to the target device during the hailing process. After receiving each message from the MASTER state device, the SLAVE state device sends an acknowledgement (ACK) message to the MASTER state device, indicating a successfully received data message. The SLAVE state device and the MASTER state device then switch to the next data channel in the data channel frequency set and continue communications until all data messages have been sent.

In MASTER state, a device "hails" a SLEEP state device by sending a hailing signal on a hailing channel to the targeted SLEEP state device. The MASTER state device selects which hailing channel to use based on: 1) the SLEEP state device's predefined pseudorandom hailing channel frequency set, 2) a system time corresponding to the hailing channel frequency set, and 3) a unique serial number (the "nodeID") of the SLAVE state device. The system time on the MASTER state device and the system time on the SLAVE state device are substantially in synchronization. Upon successfully "hailing" the sleeping device (which upon hailing becomes a SLAVE state device), the MASTER state device begins sending data messages on a data channel to the SLAVE state device. The data channel is selected from the SLAVE state device's predefined pseudorandom data channel set based on the system time. In one embodiment, the data channel frequency set is common to the MASTER state device and the SLAVE state device. In such a configuration, the MASTER state device may indicate to the SLAVE state device during the hailing procedure what the next available data channel is by sending to the SLAVE state device a data channel pointer.

Hailing channels and data channels are preferably selected from the 902-928 MHz industrial, scientific, and medical (ISM) bandwidth, although other frequency ranges may be possible. In one embodiment, one hundred (100) channels are chosen with a minimum channel spacing of 100 kHz each. Fifty (50) of the channels are randomly assigned to the pseudorandom data channel frequency set, and fifty (50) different channels are randomly assigned to the hailing channel frequency set. The set of fifty (50) hailing channels are used during the MASTER and SLEEP states to send and receive hailing requests while the set of fifty (50) data channels are used during the MASTER and SLAVE states to send and receive data messages.

In one embodiment, a particular radio frequency device selects an initial subset of two (2) consecutive channels (i.e., a channel group) from its predefined pseudorandom hailing channel frequency set to be used while in the SLEEP state (by first calculating a channel offset based on its unique assigned serial number (the "nodeID")). This offset is added to a hailing channel pointer. The hailing channel pointer points to one of the fifty (50) available hailing channels, and increments to the next set of two (2) channels every, for example, 18 seconds so that each device will continuously "hop" through all of the fifty (50) available hailing channels at a system hopping rate. In this manner, hailing channel usage is spread across the predefined hailing channels. In one embodiment, the hailing channel usage may be divided in a substantially equal manner such that each channel within the hailing channel frequency set is used for substantially the same amount of time or for substantially the same number of times. In one embodiment, the hailing channel usage might be skewed to use hailing channels with less interference more frequently while using hailing channels with more interference less frequently. When sending and receiving data messages in MASTER and SLAVE states, the devices hop through the data channel frequency set to assure that, on average, all data channels are used equally. Such an embodiment may be preferable for push communications during non-peak times (i.e., times of lower data transmission traffic) for a meter (e.g., meter 20 in FIG. 1) to initiate data communications to send utility usage data through the network (e.g., to utility provider 12 in FIG. 1). However, another embodiment may be preferable during peak times (i.e., times of higher data transmission traffic), in which a collector node (e.g., node 14 of FIG. 1 or utility provider 12) may pull data from meters (e.g., meter 20 of FIG. 1).

Pseudorandom Frequency Sets

As will be further understood, the present disclosure utilizes two pseudorandom frequency sets: a predefined pseudorandom hailing channel frequency set and a predefined pseudorandom data channel frequency set. Hailing channels and data channels are randomly selected from the 902-928 MHz ISM radio bandwidth. In one embodiment, one hundred (100) channels are chosen having a minimum channel spacing of 100 kHz each. Fifty (50) of the channels are randomly assigned to the hailing channel frequency set, and fifty (50) different channels are randomly assigned to the data channel frequency set. In one embodiment, a different number of total channels, a different number of hailing channels, and/or a different number of data channels may be used. In one embodiment, the data channels and the hailing channels are mutually exclusive (i.e., every data channel is different from every hailing channel). In one embodiment, a subset of the data channels and the hailing channels may be the same, while other data channels and other hailing channels may be different. And in one embodiment, the set of data channels and hailing channels may be the same. In one embodiment, the channel spacing may be greater or less than the 100 kHz spacing discussed above.

A non-limiting, exemplary set of 50 hailing channels (from hailing channel 0 to hailing channel 49) includes the following frequencies:

| Ch. | Freq. | Ch. | Freq. | Ch. | Freq. | Ch. | Freq. |
|---|---|---|---|---|---|---|---|
| 0 | 926.8 MHz | 1 | 922.96 MHz | 2 | 925.48 MHz | 3 | 922.72 MHz |
| 4 | 922 MHz | 5 | 925.96 MHz | 6 | 922.84 MHz | 7 | 922.48 MHz |
| 8 | 923.32 MHz | 9 | 925 MHz | 10 | 923.2 MHz | 11 | 924.52 MHz |
| 12 | 925.12 MHz | 13 | 922.6 MHz | 14 | 923.68 MHz | 15 | 925.36 MHz |
| 16 | 924.16 MHz | 17 | 927.76 MHz | 18 | 927.88 MHz | 19 | 927.4 MHz |
| 20 | 924.76 MHz | 21 | 924.28 MHz | 22 | 926.92 MHz | 23 | 926.44 MHz |
| 24 | 927.16 MHz | 25 | 922.63 MHz | 26 | 924.04 MHz | 27 | 923.92 MHz |
| 28 | 923.56 MHz | 29 | 923.08 MHz | 30 | 922.24 MHz | 31 | 927.28 MHz |
| 32 | 926.2 MHz | 33 | 926.08 MHz | 34 | 923.8 MHz | 35 | 924.88 MHz |
| 36 | 925.24 MHz | 37 | 925.84 MHz | 38 | 923.44 MHz | 39 | 927.52 MHz |
| 40 | 922.12 MHz | 41 | 926.56 MHz | 42 | 924.64 MHz | 43 | 927.64 MHz |
| 44 | 924.4 MHz | 45 | 927.04 MHz | 46 | 926.68 MHz | 47 | 925.72 MHz |
| 48 | 926.32 MHz | 49 | 925.6 MHz | | | | |

In one embodiment, these hailing channels may be grouped into hailing channel groups. For example, hailing channel group 0 may include hailing channels 0 and 1 (908.15 MHz and 919.8 MHz in the above example), while hailing channel group 1 may include hailing channels 2 and 3 (922.65 MHz and 902.65 MHz in the above example), continuing through hailing channel group 24. More generally, hailing channel group "n" may include hailing channel "x" and hailing channel "x+1" where "x" represents a hailing channel. In other embodiments, hailing channel groups may include a different number or combination of hailing channels.

A non-limiting, exemplary set of 50 data channels (beginning with data channel 0 and continuing through data channel 49) includes the following frequencies:

| Ch. | Freq. | Ch. | Freq. | Ch. | Freq. | Ch. | Freq. |
|---|---|---|---|---|---|---|---|
| 0 | 922.94 MHz | 1 | 922.1 MHz | 2 | 923.78 MHz | 3 | 922.46 MHz |
| 4 | 926.9 MHz | 5 | 927.26 MHz | 6 | 922.82 MHz | 7 | 923.3 MHz |
| 8 | 927.86 MHz | 9 | 927.5 MHz | 10 | 923.9 MHz | 11 | 926.42 MHz |
| 12 | 925.46 MHz | 13 | 927.38 MHz | 14 | 926.3 MHz | 15 | 925.7 MHz |
| 16 | 925.1 MHz | 17 | 926.18 MHz | 18 | 925.94 MHz | 19 | 924.02 MHz |
| 20 | 927.98 MHz | 21 | 926.66 MHz | 22 | 924.98 MHz | 23 | 927.62 kHz |
| 24 | 924.74 MHz | 25 | 925.22 MHz | 26 | 925.34 MHz | 27 | 924.62 MHz |
| 28 | 924.5 MHz | 29 | 926.54 MHz | 30 | 924.14 MHz | 31 | 923.66 MHz |
| 32 | 925.58 MHz | 33 | 922.22 MHz | 34 | 924.26 MHz | 35 | 927.02 MHz |
| 36 | 922.34 MHz | 37 | 926.06 MHz | 38 | 926.78 MHz | 39 | 923.42 MHz |
| 40 | 927.74 MHz | 41 | 924.86 MHz | 42 | 924.38 MHz | 43 | 922.7 MHz |
| 44 | 922.58 MHz | 45 | 925.82 MHz | 46 | 923.54 MHz | 47 | 927.14 MHz |
| 48 | 923.18 MHz | 49 | 923.06 MHz | | | | |

In one embodiment, these data channels may be grouped into data channel groups. For example, data channel group 0 may include data channels 0 and 1 (922 MHz and 904.5 MHz in the above example), while data channel group 1 may include data channels 2 and 3 (908 MHz and 925 MHz in the above example), continuing through data channel group 24. More generally, data channel group "p" may include data channel "y" and data channel "y+1" where "y" represents a data channel. In other embodiments, data channel groups may include a different number or combination of data channels. In one embodiment, the data channels are not grouped.

In one embodiment, the hailing channel frequency set and the data channel frequency set are unique to each device/node within the system. However, in one embodiment, the hailing channel frequency set and the data channel frequency set may be the same or contain a portion of the same frequency channels. Each device/node has a "nodeID" which identifies it within the network. A device wishing to send a communication to a target device utilizes the target device's "nodeID" to identify the correct hailing channel frequency set and data channel frequency set to use for that particular target device. The "nodeID" is an identifier, such as an alphabetic and/or numeric string, associated with and unique to a device.

Mesh Network Topology

FIG. 1 is a block diagram showing an embodiment of a mesh network 10 (such as an AMI mesh network) in a hierarchical configuration. The configuration of components of the mesh network 10 shown in FIG. 1 is merely one embodiment, and additional devices or alternative configurations may be used. Although the mesh network 10 may typically be distributed throughout a geographical region, the block diagram of FIG. 1 shows a hierarchy to emphasize the parent/child relationships among the various components. As illustrated, the mesh network 10 includes a utility provider 12, a first level of intermediate nodes 14, a second level of intermediate nodes 16, a lowest level of intermediate nodes 18, and meters 20. In some embodiments, the intermediate nodes may be meters themselves or may be integrated with or connected to meters. Also, the meters 20 may further act as intermediate nodes to additional meters. In some embodiments, the intermediate nodes may be configured as stand-alone devices for assisting in the transfer of data between the utility provider 12 and meters 20. The mesh network 10 may include any number of levels X of intermediate nodes between the utility provider 12 and the meters 20. The number of levels between the meters 20 and the utility provider 12 is not necessarily the same for each meter 20. Some of the nodes 14, 16, 18 may be configured as meters as well and may be capable of both measuring utility data and communicating with lower level nodes and/or meters. In some embodiments, meters 20 may further act as nodes or even may become a node to child meters as additional meters are added to the network.

In some embodiments, any of utility provider 12, nodes 14, 16, 18, and meters 20 may be configured to be collectors for aggregating and collecting data such as utility usage data from meters 20. For illustrative purposes, node 14 (shown as node 1.2 in FIG. 1), may be a configured as a collector node for aggregating and collecting data from nodes 2.1, 2.2, 2.3, 2.b (which in turn may also be configured as collector nodes), as will be further discussed herein. Similarly, utility provider 12 may also be configured as a collector node for aggregating and collecting data from each of the nodes within mesh network 10.

In one embodiment, utility provider 12, acting as a parent, communicates directly with intermediate nodes 1.1, 1.2, 1.3, . . . 1.a of the first level of intermediate nodes 14, which may be defined as child nodes with respect to the utility provider 12. Any number "a" of intermediate nodes 14 may be configured in the first level. Each of the intermediate nodes 14 in the first level may be configured as a parent to one or more intermediate nodes 16 in the second level and communicate directly with these intermediate nodes 16. The intermediate nodes 14 may include any number "b" of child nodes 16. In this example, the intermediate node 1.2 of the first level of nodes 14 has child nodes 2.1, 2.2, 2.3, . . . 2.b in the second level of intermediate nodes 16. This arrangement continues down the hierarchy to the lowest level of intermediate nodes 18, which may include any number "y" of nodes. Node X.2, for example, is illustrated with a number "z" of meters 20, which are configured as children of node X.2. Further, each child node may have multiple parent nodes; for example, node 2.2 may have as its parent nodes 1.1, 1.2, and 1.3.

Figure 2:
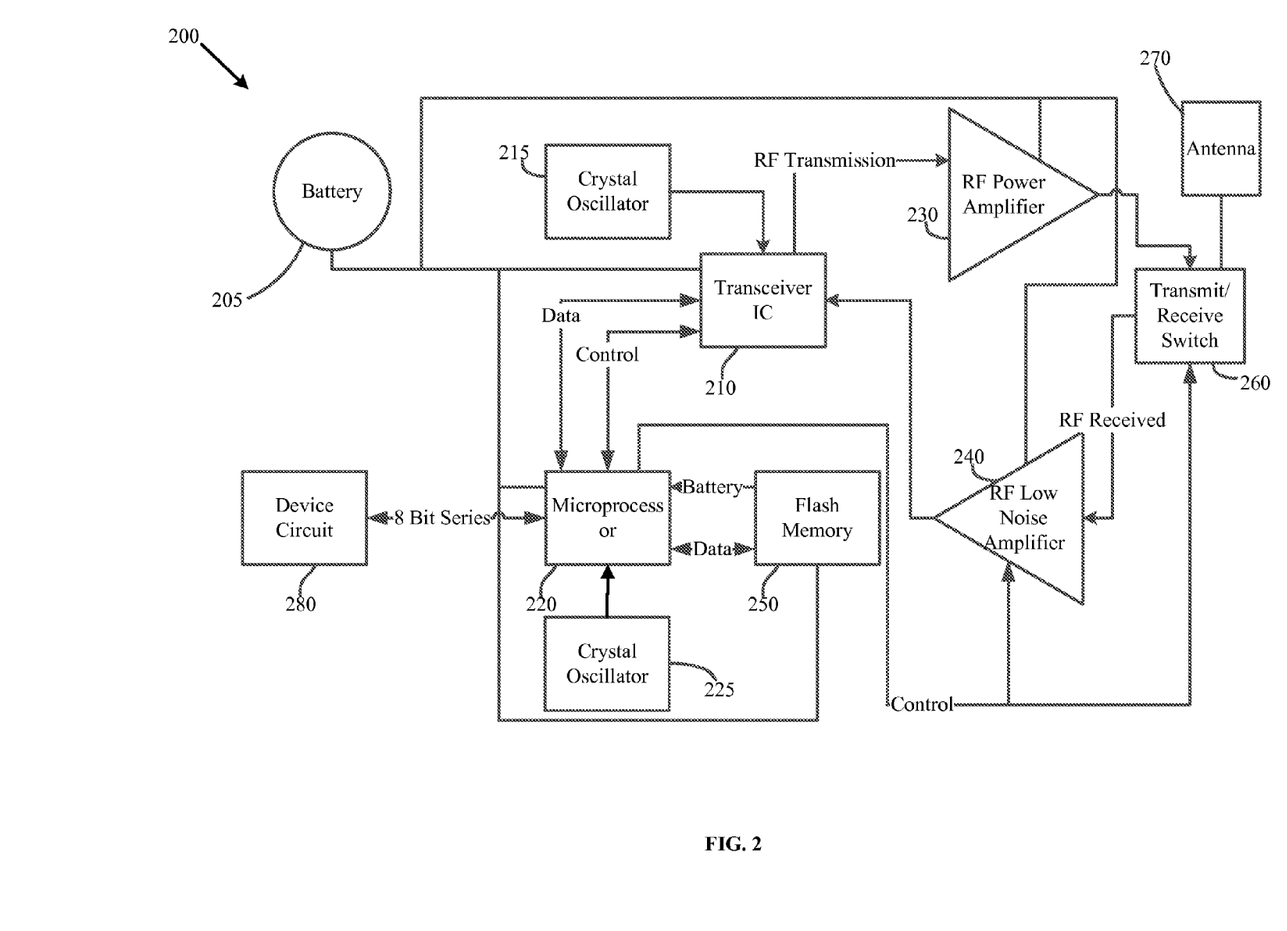
FIG. 2 is a block diagram of a radio frequency circuit in accordance with one embodiment of the present disclosure.

The utility provider 12, intermediate nodes 14, 16, 18, and meters 20, according to various implementations, may comprise circuitry and functionality to enable radio frequency (RF) communication among the various components, such as the embodiment shown in FIG. 2. The dashed lines shown in FIG. 1 may represent RF communication channels between the different components. The wireless communication between the devices 12, 14, 16, 18, and 20, for instance, may be active during some periods of time (when two respective devices are linked) and may be inactive during other periods of time (when the devices are not linked and/or are in sleep mode). Alternatively, any of the nodes may be connected together through wired connections (e.g., coaxial, fiber optic, etc.).

The utility provider 12, or a server associated with the utility provider 12, may be configured to manage the relationships between the various intermediate nodes and meters. In some cases, the parent/child relationships may be changed as needed to more evenly distribute the child nodes among the parents. The utility provider 12 may maintain a table of child nodes of each intermediate node and those meters associated with the lowest-level intermediate nodes 18 in a child relationship. In some embodiments, the intermediate nodes themselves may automatically configure and/or re-configure their own parent/child relationships with one another.

As discussed above, the intermediate nodes 14, 16, and 18 may remain in a sleep mode until a related parent or child wishes to communicate with the node. In this case, the device wishing to establish communication with the intermediate node is considered to be the master device and the intermediate node itself is the slave device. The master device sends a hailing signal, which, when received, causes the slave device to awaken from the sleep mode. For synchronizing the master and slave devices, the master device then sends a ping signal and the slave returns a pong (i.e., acknowledgement or ACK) signal. These signals establish time synchronization characteristics between the devices. When synchronized, the master device is able to transmit data to the slave device.

RF Circuit

As seen in FIG. 2, an RF circuit 200 may be included in any of the AMI devices shown in FIG. 1, such as utility provider 12, nodes 14, 16, 18 and meters 20. RF circuit 200 within each of utility provider 12, nodes 14, 16, 18 and meters 20 enables the devices to communicate wirelessly with one another. Battery 205 powers a transceiver integrated circuit (IC) 210, a microprocessor 220, an RF power amplifier 230, an RF low noise amplifier 240, and flash memory 250. Crystal oscillators 215, 225 are connected to transceiver IC 210 and microprocessor 220, respectively. The circuit 200 includes a transmit/receive switch 260 and antenna 270. Although flash memory 250 is specified, any type of memory such as RAM, ROM, flash memory, etc. may be used with RF circuit 200, as understood by those having skill in the art.

A data line connects antenna 270 to the transmit/receive switch 260. RF received data from antenna 270 is fed into RF low noise amplifier 240 and then to transceiver IC 210. Transceiver IC 210 is connected to microprocessor 220 and to RF power amplifier 230. If RF transmission data is to be sent to antenna 270 and, thereby, to another remotely located node (for example, from node 14 to node 16 of FIG. 1), it is transmitted to the RF power amplifier 230 where it is amplified and transmitted to transmit/receive switch 260 and on to antenna 270 for communication. In one implementation, meter data is wirelessly received and transmitted to and from a host and remotely located meter nodes connected to water meters.

Microprocessor 220 and transceiver IC 210 include both a two-way data and a two-way control line. Microprocessor 220 includes a control line to each of RF low noise amplifier 240 and transmit/receive switch 260. Microprocessor 220 is also connected to flash memory 250 by both a two-way data line and by a battery status line, the battery line included so that flash memory 250 may notify microprocessor 220 of its power and battery status. Finally, microprocessor 220 is connected to a device circuit 280. In one embodiment, device circuit 280 may include a utility meter such as a water meter or an electricity meter. In one embodiment, device circuit 280 may be a reporting and testing device, such as a water or gas leak detection device. These examples are not meant to be limiting, and those of skill in the art will recognize that alternative device circuits may be used in conjunction with the present disclosure. Note, other supporting circuitry and memory may not be shown in the figures of this disclosure but would be understood by those of reasonable skill in the art.

RF circuit 200 may be configured on various radio topologies in various embodiments, including point-to-point, point-to-multipoint, mesh networking, and Star, among others. RF circuit 200 may be configured to communicate in multiple topologies or in one of multiple topologies.

Optionally, and not shown in FIG. 2, any of the RF devices shown in FIG. 1, such as node 14 (when configured as a collector device), may include a second RF circuit similar to or the same as RF circuit 200. In this way, the RF device, such as collector device 14 of FIG. 1 may be configured to include two transceivers for sending and receiving data. In one embodiment having two transceivers, for example, one transceiver may be configured for normal network traffic, such as transmission of utility usage data from meter 20 to utility provider 12, while the second transceiver may be configured to receive and process priority messages during emergency or exceptional conditions, such as alerts of a water leak.

In various other embodiments, an RF device may be configured with a single transceiver and a single receiver. As those having skill in the art will recognize, other combinations of transceivers and receivers (or the addition of a transmitter) may be preferable depending on the particular topology of a particular mesh network (or portion of a mesh network).

As discussed previously, RF devices such as those shown in FIG. 1 (utility provider 12, nodes 14, 16, 18 and meters 20) and FIG. 2 may be in one of the 3 previously defined states at any given time: SLEEP state used to conserve battery life; SLAVE state used for responding to and receiving data from a MASTER state device; and MASTER state used to initiate communications with (i.e., "hail") and to send data to a SLAVE state device.

Data Collector

Traditionally, two types of data collection may be used for collecting data in an AMI mesh network: pushing and pulling. In an embodiment utilizing the pushing configuration, data is pushed up the network hierarchy from the lowest level device up through the intermediate levels to the highest level (for example, data is pushed from meter 20, through intermediate nodes 18, 16, 14, to utility provider 12 in FIG. 1). In contrast, in an embodiment utilizing the pulling configuration, data is pulled up the network hierarchy by the highest level device through the intermediate levels from the lowest level devices (for example, utility provider 12 pulls data from meter 20 through intermediate nodes 14, 16, 18). While the pushing method may be more efficient in times of lower traffic, the pulling method may be more efficient in times of higher traffic.

For example, in one embodiment, meters (such as meters 20 of FIG. 1) that are the farthest number of hops from the collector begin reporting at a first time (e.g., 12:00 am), then meters that are one hop closer report at a second time (e.g., 1:00 am), etc., until all meters report their meter usage data during the allocated time period. During the time that the last group (i.e., the group of nodes closest to the collector) is collecting and transmitting data, the data is quite voluminous and the data is highly concentrated around the collector, leading to many collisions. Therefore, it is desirable to utilize a hybrid data collection method featuring both pushing and pulling to be used at various times within the same AMI mesh network.

Figure 3:
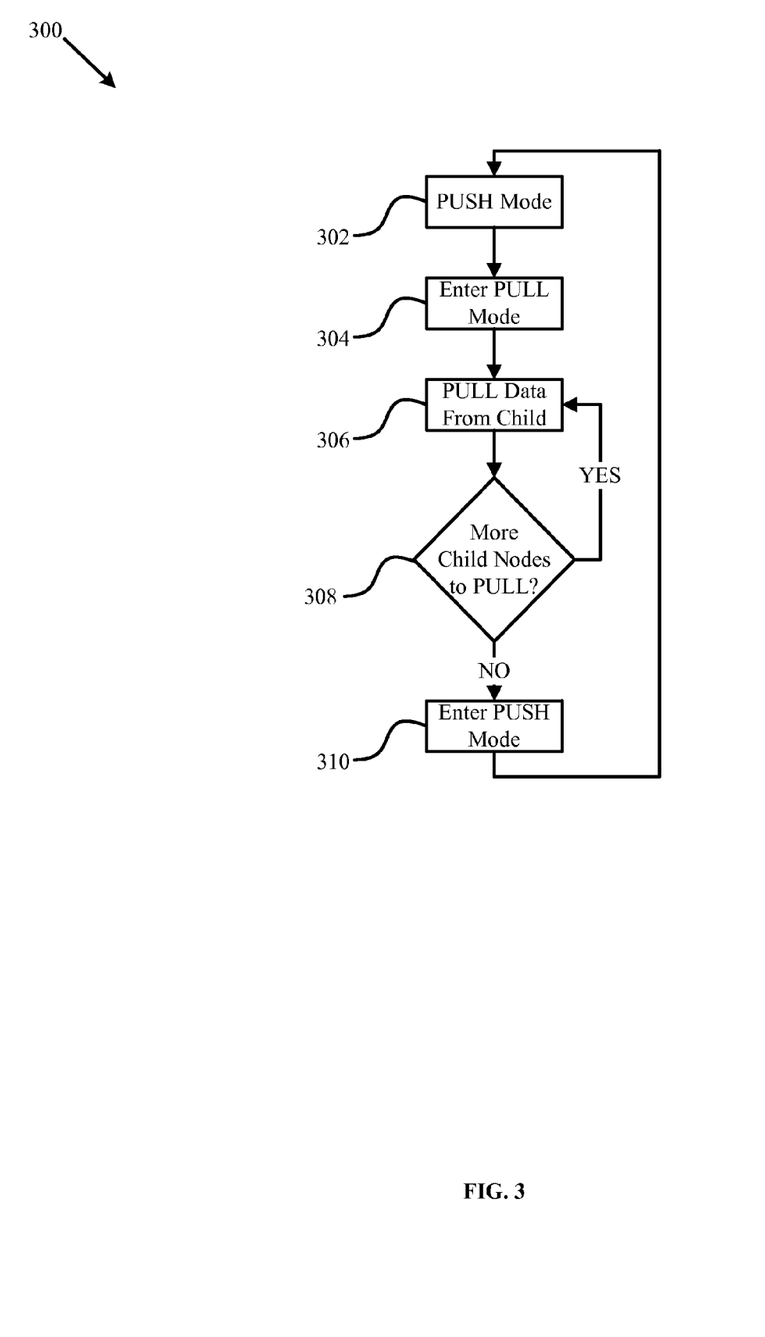
FIG. 3 is a flow diagram of one method for hybrid data collection used in a node configured as a collector in accordance with one embodiment of the present disclosure.

FIG. 3 shows a flow diagram 300 of one method for hybrid data collection used in a node (such as node 14 of FIG. 1) configured as a collector. As discussed herein, in some environments having a high number of nodes concentrated around a collection node (i.e., collector), data collisions may occur, especially during peak times of data transmissions (e.g., reporting meter usage data during times of heavier traffic), making communications between devices more difficult and less efficient. However, during off-peak times of data transmission, (e.g., reporting meter usage data during times of lighter traffic), fewer collisions may occur. It is therefore preferable, in some environments, to utilize different data collection procedures at different times (i.e., peak and off-peak).

In one embodiment, only nodes higher up the hierarchy (i.e., closer to utility provider 12 in FIG. 1) such as nodes 14 are configured as collectors, while the remaining nodes 16, 18 and meters 20 are configured using only push data collection. However, in another embodiment, any number of nodes at various levels within the AMI mesh network hierarchy may be configured as collectors. This will be made clear through the discussion of FIG. 4 below.

Turning back to flow diagram 300 of FIG. 3, at step 302, the collector device is in push mode. While in push mode, the collector is configured to receive data using the traditional hailing and data transmission methods described herein. That is, a remote device may initiate a data transfer through the hailing and data transmission methods when it has data to send to the collector.

In one embodiment, at a certain time, the collector enters pull mode at step 304, effectively exiting push mode. The certain time may be at a predetermined system time, time of day, time/day of week, or other predetermined time. The certain time may also occur as a result of a detected heavy amount of network traffic or other defined event within the AMI mesh network. Once in pull mode, the collector begins pulling data from its nearby child nodes. For example, with respect to FIG. 1 where node 14 (shown as node 1.2) is configured as a collector, nodes 16 (shown as nodes 2.1, 2.2, 2.3, 2.b) may be the nearby child nodes to be pulled. At step 306, the collector pulls data from the first child node. The collector then checks, at step 308, to see if it has additional nodes to pull data from. If so, the collector continues to pull data at step 306. Once the collector has pulled data from all appropriate nodes, it then returns to push mode, effectively leaving pull mode. This may also be triggered based on a certain time, as above, or amount of network traffic.

More specifically, the embodiment shown in FIG. 3 may include the following. At step 302, listening, by the collector node, during a listening period, for a hailing signal from a plurality of RF devices on a hailing channel, the hailing signal including identification of a specified data channel. Then, in response to receiving the hailing signal from one of the plurality of RF devices, switching to the specified data channel and receiving data, by the collector node, on the specified data channel. At step 304, entering pull mode. At step 306, collecting, by the collector node, during a polling period, data from the plurality of RF devices. Then, while in collecting mode, receiving, by the collector node, a data message from at least one of the plurality of RF devices. In the embodiment of FIG. 3, the pulling period and the pushing period occur at different times.

Collector Nodes

Figure 4:
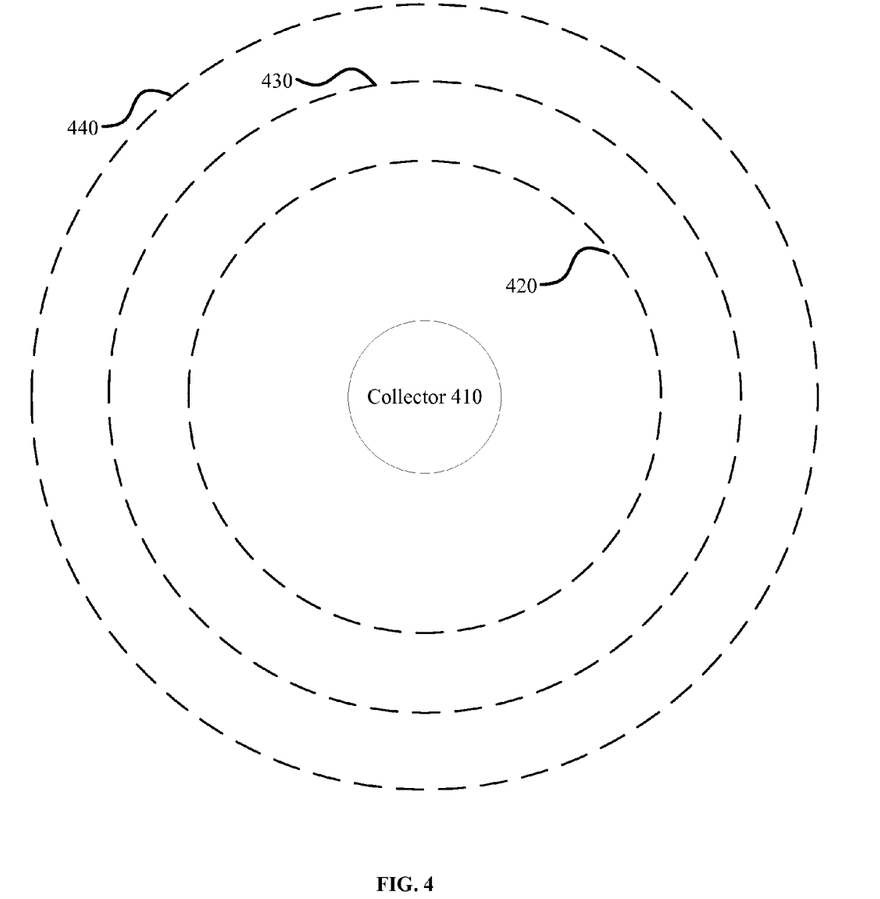
FIG. 4 is a diagram of the relationship between a collector and its surrounding child nodes according to one embodiment of the present disclosure.

FIG. 4 illustrates the relationship between a collector node 410 and its surrounding child nodes. In one embodiment, the collector 410 may utilize the hybrid data collection of FIG. 3. The circle denoted 420 represents the collector's nearest set of child nodes, which may vary in number, function, and geographic location. In the embodiment shown in FIG. 4, the nearest set of child nodes 420 may be configured to use a push only method of collecting data from their nearest child nodes (the circle denoted 430), which may also use a push only method of collecting data from their nearest child nodes (the circle denoted 440), and so forth. Any number of child nodes may be possible at each layer, and any number of layers may also be implemented. In this way, collector 410 uses the hybrid method to collect data from its nearest set of child nodes 420, while all the other nodes use a push only method. Alternatively, other nodes within the network and various hierarchal layers may be configured as collectors. It is advantageous for a node to be a collector, and thus use the hybrid data collection method, if it has numerous close nodes that all have multiple child nodes. This increases the efficiency of the data communication with the mesh network.

Priority Messages

In one embodiment, it may be desirable to include the ability for certain priority messages to be pushed from a lower level node to a higher level node, even when the higher level node, configured as a collector, is in pull mode. For example, as discussed above, should a leak occur at or near a meter, it may be desirable for that meter to send a priority message to the utility provider immediately. However, while the collector is in pull mode, it is only accepting data transmissions from a specific node, from which it has requested the data. Therefore, the priority message will be ignored by the collector. The present disclosure provides two ways to solve this problem: a multi-receiver configuration and a time-based push/pull configuration. These two solutions are discussed below.

Priority Messages: Multi-Receiver Configuration

As discussed above regarding FIG. 2, some embodiments of a collector may include a second (or more) transceiver or receiver. In an embodiment having two transceivers, a first transceiver may be configured to operate the hybrid data collection method disclosed herein, such as that of FIG. 3. Meanwhile, a second transceiver may be configured to operate only in push mode. Priority messages are queued in the second transceiver and acted upon separately from the first transceiver. In this way, the second transceiver continually "listens" for data, such as a priority message indicating an emergency condition, such as a leak, while the first transceiver facilitates normal data communications, such as collecting utility usage data from meters. Optionally, the second transceiver may, in some embodiments, be only a receiver and not a transceiver.

Priority Messages: Time-Based Push/Pull Configuration

Alternatively, it is possible to utilize a combination push/pull configuration for set times in order to receive priority messages while continuing to perform the pull method, such as the method shown in FIG. 3. For example, in one embodiment of a collector using the hybrid data collection, the collector may switch into pull mode at the appropriate time, as discussed above. However, this pull mode may be a modified pull mode that uses a push/pull configuration to pull data from its nearest nodes while also allowing for the receipt of priority messages, such as from a node reporting a leak condition.

Figure 5:
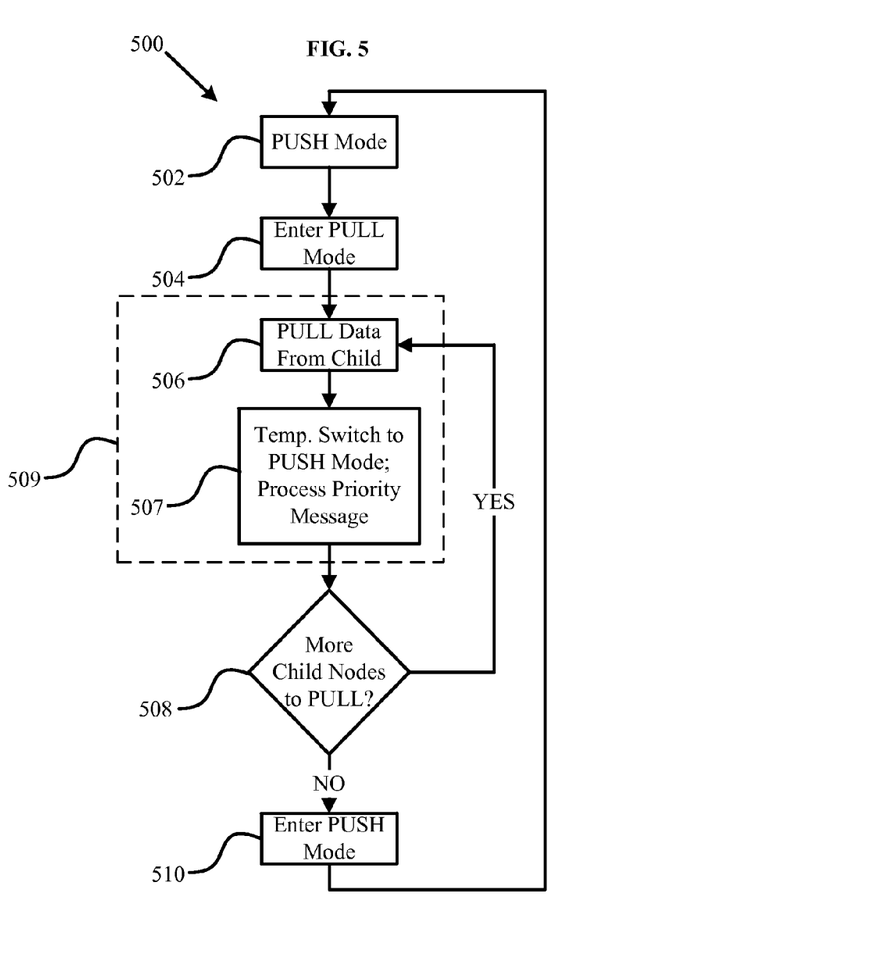
FIG. 5 is a flow diagram of one method for hybrid data collection used in a node configured as a collector having the ability to detect priority messages according to one embodiment of the present disclosure.

FIG. 5 shows a flow diagram 500 of one method for hybrid data collection used in a node (such as node 14 of FIG. 1) configured as a collector, having the ability to detect priority alerts. In one embodiment, at step 502, the collector device is in push mode. While in push mode, the collector is configured to receive data using the traditional hailing and data transmission methods described herein. That is, a remote device may initiate a data transfer through the hailing and data transmission methods when it has data to send to the collector.

In one embodiment, at a certain time, the collector enters pull mode at step 504, effectively exiting push mode. The certain time may be at a predetermined system time, time of day, time/day of week, or other predetermined time. The certain time may also occur as a result of a detected heavy amount of network traffic within the AMI mesh network. Once in pull mode, the collector begins pulling data from its nearby child nodes. For example, with respect to FIG. 1 where node 14 (shown as node 1.2) is configured as a collector, nodes 16 (shown as nodes 2.1, 2.2, 2.3, 2.b) may be the nearby child nodes to be pulled. At step 506, the collector pulls data from the first child node. The step of pulling data (step 506) may be configured to occur for a predetermined period of time, for example, 45 seconds. The collector may then, at step 507, switch temporarily to the push mode for a predetermined period of time, for example, 15 seconds. Together, the pull mode and the temporary push mode comprise a pull cycle. In various embodiments, the time period of the pull mode, the time period of the temporary push mode, and the pull cycle may all be altered, depending on the particular deployment. During the temporary switch to the push mode within the pull cycle, the collector may be configured to receive, at step 507, a priority message from any down-stream node. The collector may also be configured to process the priority message by relaying the priority message up stream ultimately to the utility provider. Together, steps 506 and 507 form a pull-push cycle 509 for alternating between pulling data and pushing data.

Upon completion of the temporary push mode at step 507, and thus completion of the pull cycle, the collector resumes pulling data from the child nodes at step 508 (i.e., the collector begins a new pull-push cycle). That is, the collector checks to see if it has additional nodes to pull data from. If so, the collector continues to pull data at step 506, entering temporarily into push mode at step 507 to receive and process priority messages, if any, once every pull-push cycle. Once the collector has pulled data from all appropriate nodes and has completed the necessary number of pull-push cycles, it then returns to push mode, effectively leaving pull mode. This may also be triggered based on a certain time, as discussed above, or amount of network traffic.

Figure 6:
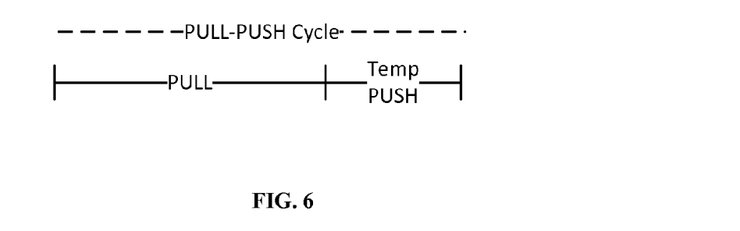
FIG. 6 is a timing diagram relating to one embodiment of priority alert method of the present disclosure.

FIG. 7 shows a timing diagram relating to one embodiment of priority alert method of the present disclosure. More specifically, FIG. 6 shows the pull-push cycle, such as pull-push cycle 509 of FIG. 5, having a pull period and a temporary push period.

Returning to FIG. 5, in one embodiment, data received at the collector from a remote node during the pull mode, at step 506, may take longer to receive than the pull period of pull-push cycle 509. For example, if time pull period of the pull-push cycle 509 is set to 45 seconds, and it takes longer than 45 seconds to receive the data packets from the remote node, the remaining data packets may be received during the next pull period of the pull-push cycle 509. In one embodiment, each data packet received may be a certain length, for example 128 kb. Upon receipt of each data packet from the remote node, the collector may send an acknowledgement to the remote node indicating that the previous packet was received successfully. In such an embodiment, each data packet may have a packet number (such as, a number sequentially assigned from the group 0 to 255). When the remote node sends data packet 0 to the collector during the pull mode of the pull-push cycle 509, and an acknowledgement message is received by the remote node from the collector, the remote node knows to send the next data packet (i.e., data packet 1). Once the pull mode time period has expired, and the pull-push cycle 509 enters the temporary push mode, the current data packet being sent by the remote node may not be fully received or processed or the collector may not send the acknowledgement. Thus, when the collector re-enters the pull mode, the remote node will know to resend the last data packet because the acknowledgement was never received.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method of receiving data by a collector node, comprising:
    listening, by the collector node, during a listening period, for a hailing signal from a plurality of RF devices on a hailing channel, the hailing signal including identification of a specified data channel;
    in response to receiving the hailing signal from one of the plurality of RF devices, switching to the specified data channel and receiving data, by the collector node, on the specified data channel;
    collecting, by the collector node, during a collecting period, data from the plurality of RF devices;
    receiving, by the collector node, the data from at least one of the plurality of RF devices;
    receiving an alert notification from a second RF device during the collecting of the one of the plurality of RF devices;
    terminating receiving data from the one of the plurality of RF devices; and
    receiving an alert data message from the second RF device, wherein the listening period and the collecting period occur at different times.

2. The method of claim 1, further comprising:
    in response to receiving the hailing signal from one of the plurality of RF devices, sending an acknowledgement to the one of the plurality of RF devices.

3. The method of claim 1, wherein receiving data from the at least one of the plurality of RF devices includes receiving utility usage data read at a utility meter.

4. The method of claim 1, wherein the listening period and the collecting period are based on a time of day.

5. A method of transmitting data to a collector node, comprising:
    initiating, by a remote node, transmitting data to the collector node during a first transmitting period, wherein initiating transmitting data to the collector node during the first transmitting period further comprises:
        sending a hailing signal to the collector node on a hailing channel, the hailing signal including identification of a specified data channel, and
        in response to receiving an acknowledgement from the collector node responsive to the hailing signal, switching to the specified data channel and sending data to the collector node on the specified data channel;
    in response to receiving a request from the collector node during a second transmitting period, transmitting data to the collector node; and
    transmitting, by the remote node, an alert notification during one of the first transmitting period and the second transmitting period.

6. A collector node, comprising:
    a processor;
    a radio frequency (RF) transceiver;
    an antenna; and
    a memory, the memory being configured to store instructions to be executed by the processor for performing the following:
        listening, by the RF transceiver, during a listening period, for a hailing signal from a plurality of RF devices on a hailing channel, the hailing signal including identification of a specified data channel;

in response to receiving the hailing signal via the antenna from one of the plurality of RF devices, switching the RF transceiver to the specified data channel and receiving data, by the RF transceiver via the antenna, on the specified data channel;

collecting, by RF transceiver, during a collecting period, data from the plurality of RF devices;

receiving, by the RF transceiver via the antenna, the data from at least one of the plurality of RF devices; and receiving an alert notification from a second RF device during the collecting of the one of the plurality of RF devices;

terminating receiving data from the one of the plurality of RF devices; and receiving an alert data message from the second RF device, wherein the listening period and the collecting period occur non-concurrently.

7. The collector node of claim 6, wherein the memory is further configured to perform the following:

in response to receiving the hailing signal from one of the plurality of RF devices, sending an acknowledgement to the one of the plurality of RF devices.

8. The collector node of claim 6, wherein receiving data from the at least one of the plurality of RF devices includes receiving utility usage data read at a utility meter.

9. The collector node of claim 6, wherein the listening period and the collecting period are based on a time of day.

* * * * *